United States Patent Office 2,808,701
Patented Oct. 8, 1957

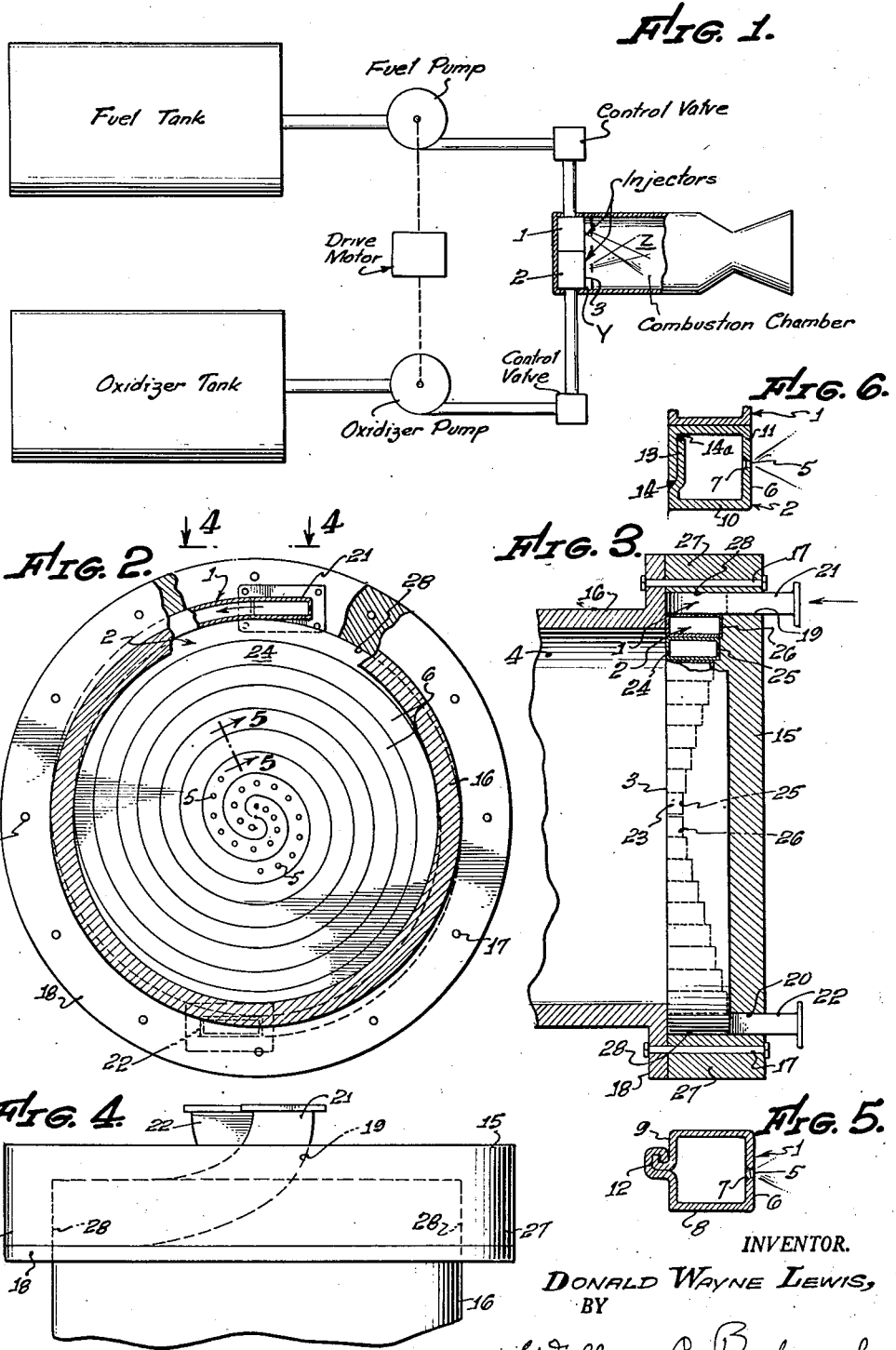

2,808,701

INJECTOR FOR ROCKET MOTOR

Donald W. Lewis, Los Angeles, Calif.

Application December 30, 1954, Serial No. 478,690

11 Claims. (Cl. 60—35.6)

This invention relates to combustion chamber injection apparatus for rocket powered motors, and more particularly to an injector which will enhance intermixing of propellant and oxidizer in the firing chamber immediately prior to ignition and combustion thereof.

One of the most important prerequisites to efficient combustion and development of power in a rocket motor resides in the even distribution of propellant and oxidizer fluids in the firing chamber. Heretofore there has been considerable difficulty encountered in attaining this desired goal in view of the extremely explosive nature of the fuel and oxidizer mixture. Mixing of these fluids has been accomplished in some injection systems with an increase in combustion efficiency, but this increased efficiency has been accompanied in most instances by a serious increase in explosion hazard.

The major object of the present invention is to provide an injection apparatus for rocket powered motors that overcomes the disadvantages of devices previously utilized for this purpose, and one which minimizes explosion hazards due to the fact that fewer possibilities of pre-mixing exist.

Another object of the invention is to provide an injector from which the oxidizer and propellant are discharged at such velocities and said injector being of such configuration that a first zone of intermixed oxidizer and propellant is provided which covers the exposed injector face, the temperature of which zone gradually rises in relation to the distance thereof from the exposed face of the injector so that at the time the propellant and oxidizer are ignited, the major portions thereof are in vapor phase.

A further object of the invention is to provide an injector from which the propellant and oxidizer are so discharged as to provide a first zone of substantially stable configuration, particularly as to thickness, whereby any pulsation therein is averted, which would prevent uniform discharge of the oxidizer and propellant from the injector.

Another object of the invention is to increase the efficiency of rocket powered motors by means of uniform intermixing of the propellant and oxidizer during the combustion process.

Yet another object of the invention is to provide a relatively lightweight injector capable of withstanding the full combustion thrust of the propellant and oxidizer inasmuch as the injector temperature is maintained at a relatively low point, below that at which the metal from which the injector is fabricated may be structurally weakened.

Still another object of the invention is to supply an injector for rocket powered motors that has an exposed face from which the propellant and oxidizer are discharged at a uniform rate in such a manner that each particle of propellant as discharged is enveloped by a layer of oxidizer.

These and other objects and advantages of the invention will become apparent from the following description thereof, and from the drawing illustrating same in which:

Figure 1 is a schematic diagram of a conventional rocket motor;

Figure 2 is a transverse end view of the injector face taken partly in section across the combustion chamber wall;

Figure 3 is a longitudinal sectional view of the injector face supporting block and combustion chamber walls with the injector tubes shown partly in section;

Figure 4 is a plan view taken on the line 4—4 of Figure 2 showing an outline representation of the injector tubes;

Figure 5 is a cross-section of an injector tube taken on the line 5—5 of Figure 2; and Figure 6 is a cross-section of a preferred form of injector tube.

As illustrated in Figure 1, the conventional rocket combustion system requires delivery of fuel and oxidizer liquid under pressure, produced by the pumps indicated, through manually or automatically operated control valves, to the injectors within the combustion chamber. The fuel and oxidizer are introduced into the firing chamber by injectors which are intended to intimately combine oxidizer and propellant and inject into the chamber during combustion. Extreme expansion of the combustion products upon ignition provides the necessary thrust for propulsion. My invention is directed to a bi-liquid injector for a rocket motor.

As seen in the drawings, the bi-fluid injector is formed by inter-adjacent convolutions of a propellant supply tube 1 and an oxidizer supply tube 2 spirally wound about a common center point, which tubes are wound one upon the other in a flat spiral in a counter-clockwise direction. Obviously, the direction of winding the tubes is of no moment, so long as they are helically wound in the same direction to define an injector face 3, which is a smooth side common to both tubes 1 and 2. It should also be evident that while injector face 3 is shown to be planar in form, it could if desired, be convex or concave with respect to the interior of the firing or combustion chamber 4.

Each of fluid supply tubes 1 and 2 contain a multiplicity of injector apertures 5 located at injector face 3, which apertures may be simple drilled holes in the tube faces 6, but which are preferably formed in the manner indicated in Figures 5 and 6. With regard to the injector aperture and tube structure shown in these figures, it will be noted that the apertures are constructed with beveled surfaces 7 on the interior of the walls of the tubes. While this feature aids in the even distribution and more complete intermixture of oxidizer and propellant by permitting injection of the fluids in a fine spray into the firing chamber, it is not essential to the operation of my highly efficient bi-fluid combustion chamber injector. However, where it is desired to bevel the interior face of the tubes in defining the apertures, the tubes may be constructed in two sections designated as 8 and 9 in Figure 5, and as 10 and 11 in Figure 6. In this event, a portion of each of the tube sections is machined to provide the beveled apertures, before they are assembled in the manner shown in Figures 5 and 6. For example, in the tube of Figure 5, sections 8 and 9 are secured together by an interfolded seam 12 oppositely positioned from the injector face, while in the tube of Figure 6, the seam is formed by offsetting section 10 at its back face so that it abuts the interior back surface 13 of section 11, and then fastening sections 10 and 11 together by welds 14a and 14.

If the apertures 5 are not interiorly beveled, or if the beveled surfaces are formed from the exterior of the tubes, it is preferable to construct the injector of seamless tubes.

The helically wound injector tubes 1 and 2 are retained in position against a circular supporting block 15 that has an annular shoulder 27, the inner circumferential side 28 of which abuts against the outermost convolutions of tubes 1 and 2 whereby the injector tubes are maintained in fixed position relative to one another. The injector is secured to chamber wall 16 by fastening bolts 17 through the supporting block and chamber wall flange 18. The supporting block 15 should, of course, be of as lightweight a construction as possible, but must be sufficiently strong to withstand the full force created by the combustion and propellant. This block is provided with diametrically opposed entry ports 19 and 20, through which the flanged inlet stacks 21 and 22 of propellant tube 1 and oxidizer tube 2 are passed.

It will be seen from Figure 3 that the injector tubes constantly diminish in cross-sectional area from the inlet stacks to the closed ends as a function of distance towards the center of the injector face. Thus the innermost convolution 23 of propellant tube 1 is considerably less in cross-sectional area than any of the outermost convolutions, as for example, the convolution generally designated 24. To assure adequate support for the injector tubes, supporting block 15 is constructed to have spiral shoulders 25 and 26 against which each of injector tubes 1 and 2 abut. It will be noted that the injector tubes define an irregularly concave surface because of the diminishment of cross-sectional area of the tubes. In addition to supporting the tubes, this spiral construction assumes the existence of a better stress pattern in the back of the injector. The convolutions of each spiral, of course, progress in the same direction, just as the convolutions of the injector tubes helically wind in the same direction.

The rapidity of decrease in the transverse cross-sectional areas of tubes 1 and 2 depends on a number of variables, the most important of which is the size and spacing of apertures 5. After fluid has traversed along the length of one of the tubes to reach an aperture 5 formed therein, a portion of the fluid is discharged rearwardly through this first aperture, with a resultant drop in fluid pressure. Such drop in fluid pressure which would normally occur due to escape of a portion of the fluid is avoided by decreasing the internal cross section of the tube. Other factors influencing the fluid pressure during inward fluid flow in one of the tubes 1 or 2 toward the center of the spiral is the viscosity of the fluid flow, viscosity variations of the fluid caused by temperature changes, loss of pressure when fluid passes through an aperture or orifice, as well as the extent of diminution of the initial internal transverse cross-sectional area of the tubes. This latter factor has a direct bearing on fluid pressure due to the fact that the tubes deform when subjected to the full thrust developed by the combustion of the propellant and oxidant.

In operation, propellant and oxidizer fluids are introduced to the injector tubes 1 and 2 under pressure through tube inlet stocks 21 and 22 at flow rates set by means of conventional control valves. These fluids then pass through the injector tubes from which they are discharged into the firing chamber 4 through the multiplicity of apertures 5 provided therein at the injector face. By diminishing the cross-sectional area of the injector tube convolutions as the innermost convolution is approached, a constant pressure is maintained within and throughout the injector tube. This is important since maintenance of constant pressure within the injector tubes makes it possible to obtain equivalent flow rates through the injector apertures, whereby delivery of uniform quantities of propellant and oxidizer from each injector aperture is achieved. This in turn results in highly efficient and even distribution of fuel and oxidizer rearwardly from the injector face into the firing chamber with a consequent increase in combustion efficiency and power output.

The injector of my invention solves other long standing problems of bi-fluid rocket motors. Due to the fact that firing chamber temperatures are well above the melting point of most commonly used metals, previous injectors of this type of necessity had to be constructed of expensive, heavy alloys, which nevertheless provided a short term operational life. The problem of such high temperatures has in the past often been overcome in part by the incorporation of cooling systems. However, my injector requires neither the use of expensive heavy metal alloys, nor the use of cooling systems. The injector can be constructed of thin-walled lightweight tubes having sufficient structural rigidity to withstand the full thrust developed by the combustion of the propellant and oxidizer. Relatively thin-walled tubes may be employed in my invention inasmuch as they are uniformly distributed and form the forward face of the combustion chamber 4, yet the tubes are not actually heated appreciably during combustion of the propellant and oxidizer due to the formation of a heat insulating layer, which will be described in detail hereinafter.

From an inspection of Figure 1, it will be evident that the aircraft with which my invention is associated is propelled forwardly due to the reactive force set up by the combustion of the propellant and oxidizer, as well as the rearward discharge of the gaseous products of combustion. It will also be seen that the face 3 of the tubes 1 and 2 receives the full reactive force arising from the combustion of the propellant and oxidizer. Inasmuch as the forward thrust desired in any particular application is known, it is possible to not only supply the oxidizer and propellant to the combustion chamber 4 at sufficiently high rates to generate such thrust, but under sufficiently high pressures at the apertures to overcome the effect of this forwardly directed force on face 3. Additionally, the velocity of propellant and oxidizer discharge must be such that a substantially stable first zone Y of appreciable thickness at all times covers the face 3, which zone is comprised of rearwardly moving propellant and oxidizer that have been discharged from apertures 5. The propellant and oxidizer are of the type that burn upon contact one with the other, but this combustion is a chemical reaction that requires a predetermined, although an extremely short time interval to effect. The propellant and oxidizer do not instantly burn upon first contact, but start to heat as the reaction therebetween is initiated, and after said short interval of time, actually burn.

Thus, the velocities at which the propellant and oxidizer are discharged must be sufficient that the distance the two fluids travel rearwardly from face 3 is appreciable before actual combustion thereof occurs. Every substance, as an inherent physical characteristic thereof, has the property of transferring heat at a predetermined rate therethrough. Accordingly, the rearward velocity of the propellant and oxidizer must be such that heat is not transferred from a second zone Z wherein combustion occurs through zone Y to face 3. Cooling of the face 3 to maintain the temperature thereof below that at which the metal of tubes 1 and 2 would be structurally weakened, is accomplished by the continuous inflow of propellant and oxidizer prior to discharge through the apertures.

The method of supplying a liquid oxidizer and propellant to a second combustion zone Z in a manner to provide a first zone Y which serves as a heat insulator and is interposed between the second zone and the injector, has been described in detail and need not be repeated.

Although face 3 defining the forward end of the combustion chamber is shown in the drawing as being flat, it is not intended that the configuration of this face be limited to this shape, for under some conditions it may be more desirable to employ a face of concave or convex curvature. Irrespective of the shape utilized, one essential function this face must perform is that of defining and helping to maintain a zone Y of relatively stable thickness, despite the fact that the oxidizer and propellant forming the zone are constantly changing.

One other element that must be considered in the design of a rocket motor embodying my injector, is the length thereof, for the motor must not be so long that sound shock waves resulting from the discharge of hot gases therefrom are propagated forwardly and then reflected rearwardly in phase to amplify additional shock waves. In a situation where the pressure varies in a regular pattern within the confines of the combustion chamber, it gives rise to a variation of pressures of the same pattern on the propellant and oxidizer in zone Y. Pressure increase on zone Y will cause momentary decrease in the flow of propellant and oxidizer, and a decrease in pressure on this zone will have the opposite effect. In this manner, the feed of propellant and oxidizer will start pulsing in phase with the pressure variation set up by shock waves, with such pulsation increasing in violence to a point that it might lead to ultimates destruction of the motor. Such phase pulsation is most dangerous, as it may eventually build up to actual vibration of the side walls defining the combustion chamber, with both the side walls and support 15 being subjected to sudden and repeated stresses of magnitudes far in excess of those which they are designed to withstand.

Although the invention herein shown and described is fully capable of achieving the objects and providing the advantages hereinbefore mentioned, it is to be understood that it is merely the presently preferred embodiment of the invention, and that I do not mean to be limited to the details of construction, other than as defined in the appended claims.

I claim:

1. A rocket motor injector comprising: convolutely wound adjacently disposed liquid fuel and oxidizer conveying tubes; and a supporting block for said tubes through which passage means extend and through which passage means said propellant and oxidizer are supplied to said tubes, which tubes are so disposed as to define an injector face spaced from said supporting block, said tubes having a multiplicity of apertures formed therein.

2. A rocket motor injector comprising: a supporting block in which a plurality of inlet ports are formed; and two tubes helically wound one upon the other in the same direction about a common axis, which tubes are disposed against and adjacent one face of said block, with the outermost end portion of each of said tubes communicating with one of said inlet ports, said tubes having a multiplicity of apertures formed in the sides thereof opposite the sides of said tubes adjacent said block.

3. A rocket motor injector comprising: a supporting block having a plurality of inlet ports formed therein; and two separate helically wound mutually adjacent tubes situated rearwardly from said block, said tubes having a plurality of apertures formed in the rearwardly disposed sides thereof, with the forward sides of said tubes abutting against the rearwardmost face of said block, which tubes are closed on the innermost ends thereof.

4. A rocket motor injector comprising: a plurality of tubes, each having a closed end and a fluid receiving inlet end, said tubes being rolled one upon the other, in a spiral to define a front portion and a rear portion with the sides of said tubes defining said rear portion having fluid discharge openings formed therein; and a supporting block against which said rear portion is retained, which block is provided with two fluid inlet ports that communicate with said inlet ends.

5. A rocket motor injector as defined in claim 4 in which said tubes each gradually diminish in cross-sectional area from their inlet ends to their closed ends.

6. A rocket motor injector as defined in claim 4 in which the rate of fluid flow through each opening is of substantially the same magnitude.

7. A rocket motor injector comprising: a supporting block; and two tubes wound one upon the other in a flat spiral to define a side common to each of said tubes, which tubes have one closed end and fluid inlet stacks at the ends opposite thereto, with the cross-sectional area of said tubes gradually diminishing relative to the distance thereof from said stack ends, said tubes being so retained against said block that said common side is outwardly disposed from said block, said tubes having a multiplicity of apertures formed in the portions thereof defining said common side.

8. A rocket motor injector as set forth in claim 7 in which said apertures are beveled on the interior walls of said tubes.

9. A rocket motor injector comprising: a circular supporting block having at least one inlet port; a liquid propellant supply tube closed at one end provided with an inlet stack at the other end, the cross-sectional area of which tube gradually diminishes in size from said stack to said closed end, said tube being so wound as to define a flat spiral having a first face of predetermined transverse profile and a second oppositely disposed face in contact with said block and maintained in fixed position thereby, said inlet stack communicating with said inlet port, with said tube having a multiplicity of apertures provided in those portions thereof defining said first face.

10. The rocket motor injector as set forth in claim 9 in which said apertures are beveled on the interior walls of said tube.

11. The rocket motor injector as set forth in claim 9 in which said first face is planar in form and said second face is of irregular concave configuration, with said block having an annular shoulder, the inner circumferential side of which abuts the outermost convolutions of said flatly wound tube.

References Cited in the file of this patent

UNITED STATES PATENTS

| | | |
|---|---|---|
| 2,532,709 | Goddard | Dec. 5, 1950 |
| 2,551,112 | Goddard | May 1, 1951 |